United States Patent
Sears et al.

(10) Patent No.: US 12,469,029 B1
(45) Date of Patent: Nov. 11, 2025

(54) SYSTEMS AND METHODS FOR PROVIDING A DELEGATE NOTIFICATION SCHEME

(71) Applicant: Wells Fargo Bank, N.A., San Francisco, CA (US)

(72) Inventors: Christie A. Sears, Charlotte, NC (US); Bradford A. Shea, Mint Hill, NC (US); Matthew J. Heffron, Bishop, GA (US); Alicia C. Jones-McFadden, Fort Mill, SC (US); Anthony Scott Best, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 229 days.

(21) Appl. No.: 17/935,736

(22) Filed: Sep. 27, 2022

(51) Int. Cl.
G06Q 20/38 (2012.01)
G06F 9/54 (2006.01)
G06Q 20/40 (2012.01)

(52) U.S. Cl.
CPC .......... *G06Q 20/389* (2013.01); *G06F 9/542* (2013.01); *G06Q 20/4016* (2013.01)

(58) Field of Classification Search
CPC ... G06Q 20/389; G06Q 20/4016; G06F 9/542
USPC ......................................................... 705/35
See application file for complete search history.

(56) References Cited

U.S. PATENT DOCUMENTS

| | | | |
|---|---|---|---|
| 7,707,089 B1 | 4/2010 | Barton et al. | |
| 8,041,636 B1* | 10/2011 | Hunter | G06Q 40/06 705/40 |
| 8,706,557 B1* | 4/2014 | Tavares | G06Q 20/204 705/16 |
| 9,094,388 B2 | 7/2015 | Tkachev | |
| 10,356,028 B2 | 7/2019 | Valla | |
| 11,232,447 B2 | 1/2022 | Acuña-rohter | |
| 2005/0283753 A1* | 12/2005 | Ho | H04L 51/52 709/224 |
| 2007/0288373 A1* | 12/2007 | Wilkes | G06Q 20/108 705/42 |
| 2008/0071465 A1* | 3/2008 | Chapman | G01C 21/3691 701/117 |
| 2009/0210886 A1* | 8/2009 | Bhojwani | G06Q 20/325 719/318 |
| 2010/0274689 A1* | 10/2010 | Hammad | G06Q 20/3255 707/E17.107 |
| 2011/0320275 A1* | 12/2011 | O'Sullivan | G06Q 30/0255 705/14.66 |

(Continued)

*Primary Examiner* — Hai Tran
(74) *Attorney, Agent, or Firm* — SCHWEGMAN LUNDBERG & WOESSNER, P.A.

(57) ABSTRACT

Systems and methods may generally include creating a notification scheme for alerting delegates for a user. An example method includes creating a data store including one or more delegates associated with one or more intervention alert trigger events. Transaction data may be received and based on the transaction data and the trigger events, one or more triggered events may be determined. Based on the triggered events(s), notification messages may be transmitted to one or more particular delegates and response message(s) may be received. In some examples, priority data may be received setting how individual delegates receives notifications or setting how notification messages are transmitted to multiple delegates associated with the same triggered event.

16 Claims, 7 Drawing Sheets

(56) References Cited

U.S. PATENT DOCUMENTS

| | | | |
|---|---|---|---|
| 2013/0325598 A1* | 12/2013 | Shao | G06Q 40/02 |
| | | | 705/14.49 |
| 2014/0172577 A1* | 6/2014 | Rephlo | G06Q 20/321 |
| | | | 705/14.64 |
| 2014/0266686 A1* | 9/2014 | Torgersrud | H04N 7/141 |
| | | | 340/521 |
| 2015/0081557 A1* | 3/2015 | Kinfoil | G06Q 20/3224 |
| | | | 705/44 |
| 2016/0371689 A1* | 12/2016 | Brown | G06Q 20/384 |
| 2019/0213498 A1 | 7/2019 | Adjaoute | |

* cited by examiner

FIG. 5

| TRIGGER EVENT 612 | DELEGATES 614 | NOTIFY PRIORITY 616 | COMMUNICATION PRIORITY 618 |
|---|---|---|---|
| CC; $100<Amount ≤ $500 | Delegate A | | A: EMAIL, TEXT; SEQUENTIAL |
| CC; $500<Amount ≤ $1,000 | Delegate A OR B | SEQUENTIAL | A: EMAIL, TEXT; SEQUENTIAL<br>B: EMAIL, TEXT; SIMULTANEOUS |
| CC; $1,000<Amount ≤ $5,000 | Delegate A and B | SEQUENTIAL | A: EMAIL, TEXT; SEQUENTIAL<br>B: EMAIL, TEXT; SIMULTANEOUS |
| CC; Amount > $5,000 | Delegate B and C | SIMULTANEOUS | B: EMAIL, TEXT; SIMULTANEOUS<br>C: TEXT, PHONE; SEQUENTIAL |

SYSTEMS AND METHODS FOR PROVIDING A DELEGATE NOTIFICATION SCHEME

BACKGROUND

Fraudulent transactions involving vulnerable populations, such as the elderly, remain a significant problem. In some cases, a vulnerable individual may be unaware that an offer is fraudulent and, in other cases, may believe it is fraudulent but feel obligated to engage in a transaction. It is estimated that individuals 60 years or older have incurred yearly fraud-related losses of over $1.0 billion.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates user interfaces for generating and viewing notification alerts in accordance with some embodiments.

FIG. 6 illustrates a notification scheme in accordance with some embodiments.

DETAILED DESCRIPTION

The inventors have recognized a need for vulnerable users (e.g., elderly customers) to have trusted advisors notified of transactions in a timely manner to avoid fraudulent transactions. The challenge with fraudulent offers is that it they are often designed to place users in high-stress situations to encourage impulsive decisions. Thus, a vulnerable user often does not have time to seek input from a trusted advisor.

The systems and techniques described herein provide a technological framework to address these issues and facilitate providing users (e.g., vulnerable consumers) with delegate notifications that engage delegates in the event an intervention alert is triggered by a transaction. The present subject matter may, for example, create a delegate notification scheme for a user, where the delegate notification scheme includes one or more delegates for a user and one or more intervention alert trigger events associated with each of the delegates. Data from transactions may be received, trigger event(s) may be determined to be triggered, and notification message(s) sent to the delegate(s) associated with each trigger event. In some examples, the present subject matter may further include receiving priority data for the one or more delegates and transmitting notification message(s) based on the priority data. The priority data may, e.g., include a simultaneous notification setting where notification messages are simultaneously transmitted to multiple delegates. In another example, the priority data may include a priority notification setting where a notification message is transmitted to a first delegate and then optionally a second delegate. Notified delegates may take a number of actions including, for example, approving or rejecting a transaction, flagging the transaction (e.g., for fraud review), and/or contacting the user. The present subject matter may also use fraud models to determine a fraud output (e.g., a fraud score or category) and, based on the fraud output, determine whether trigger events are triggered, and notify delegate(s) of the user accordingly. The present subject provides these and other ways to provide delegate notifications for users to avoid fraudulent transactions.

Figure 1:
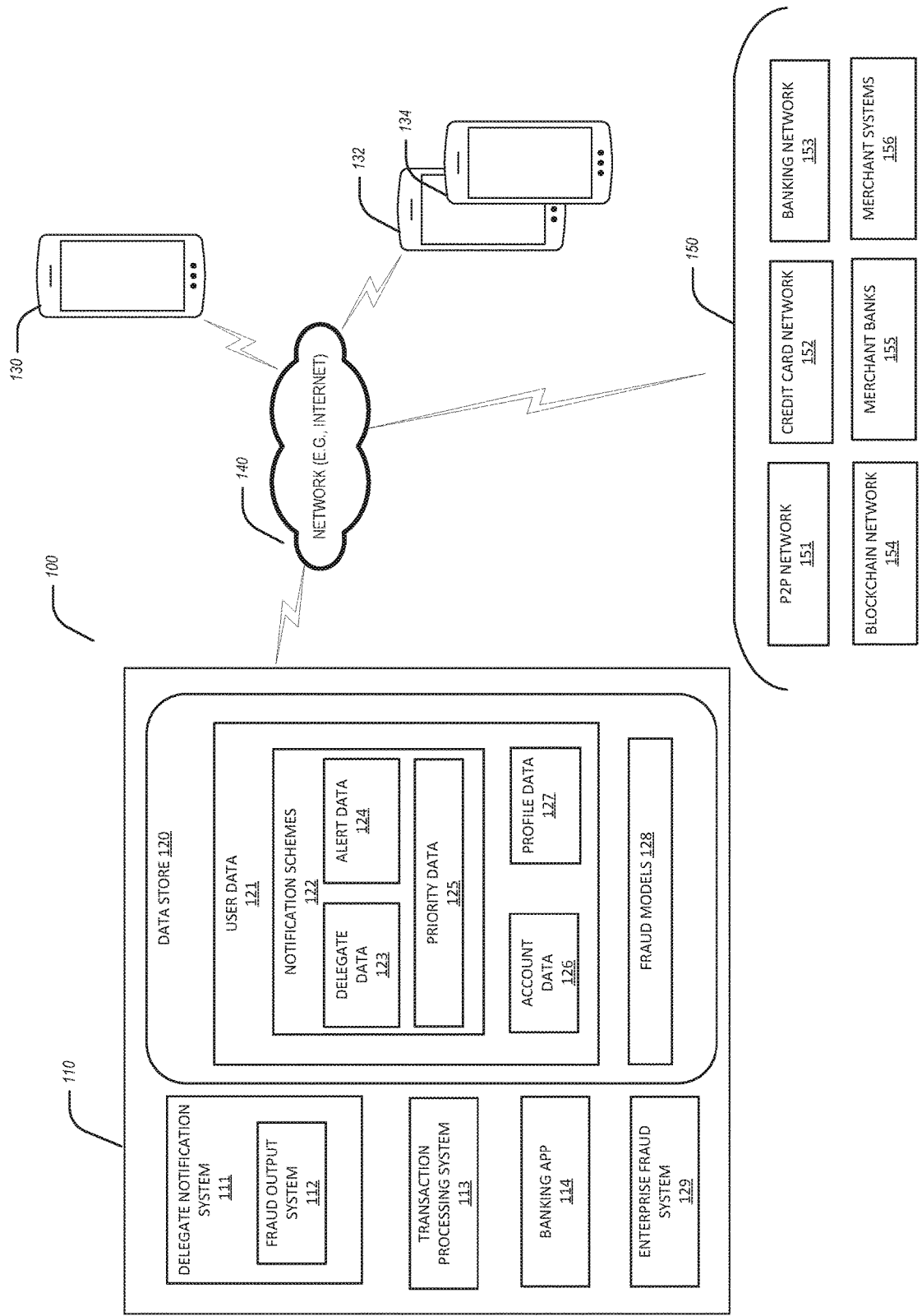
FIG. 1 illustrates a system for providing delegate notifications in accordance with some embodiments.

FIG. 1 illustrates an example environment 100 for providing delegate notifications for potentially fraudulent transactions in accordance with some embodiments. The environment 100 includes a financial institution (FI) system 110 that may provide delegate notifications for vulnerable users such as the elderly. The FI system 110 may, for example, be a server system associated with a financial institution such as a bank, a peer-to-peer (P2P) payment company, a digital currency exchange, or any system which is involved with transactions with a user. The FI system 110 may include a transaction processing system 113 for receiving transaction data related to a user transaction. The transaction data may be received from a user device 130 (e.g., from a user), from another device associated with the FI system 110 (e.g., from a bank teller), or one or more of the financial systems 150 (e.g., from a merchant system 156 or a credit card network 152), as examples. Transaction data may relate to any transaction including, for example, credit card transactions, debit card transactions, ACH transactions, wire transaction, and P2P transactions. Transaction data may include any data related to a transaction including, for example, user name or identification, user account number, merchant name, merchant account number, amount of the transaction, location of the transaction, type of transaction, user voice or text data, and merchant voice or text data.

The FI system 110 further includes a delegate notification system 111 which may provide delegate notifications for user transactions. The delegate notification system 111 may receive transaction data and determine whether to alert delegate(s) of the user based on trigger events. The delegate notification system 111 may for example create delegate notification schemes 122 which may delegate data 123, alert data 124 and optionally priority data 125. Delegate data 123 may include delegate names and contact information. Alert data 124 may include one or more intervention alert trigger events. Intervention alert trigger events may be based on a variety of factors, including one or more of a transaction amount, a transaction type, a merchant type, and an account type. A delegate notification scheme for a user may include one or multiple delegates where each delegate is associated with one or multiple intervention alert trigger events.

The priority data may establish a prioritization scheme for prioritizing the transmission of message(s) to the delegate(s). This may include prioritizing how messages are transmitted to a delegate (e.g., text, phone, and/or email; sequential or simultaneous) or how messages are transmitted when multiple delegates are to be notified (e.g., sequential or simultaneous). Sequential message transmission may include sending a message to one delegate and waiting for the delegate to response, or for a time period to elapse, before sending a message to another delegate. Simultaneous messaging may, for example, include sending messages at the same time, near the same time, or independently at different times (e.g., messages sent at different times but with one message not being dependent on another message or response to another message).

The FI system 110 may further include a fraud output system 112. The fraud output system 112 may receive transaction data and determine a fraud output for the transaction, such as a fraud score or fraud category. In one example, the fraud output system 112 uses fraud models 128 (e.g., machine learning models) for determining the fraud output. For example, the fraud output system 112 may retrieve a fraud model, input transaction data into the fraud model, and receive a fraud output such as a fraud score or category. Based on the fraud output, the delegate notification system 111 may determine delegate(s) of the user to notify for the transaction. For example, the delegate notification system 111 may query a notification scheme with the fraud score (and optionally other transaction data) to determine if a trigger event is triggered, determine the particular delegate(s) associated with the trigger event, and transmit message(s) to the particular delegate(s). In one example, the fraud output system 112 uses a machine learning (ML) engine to determine a fraud output. An example ML engine is described with reference to FIG. 4 below. An ML engine may be part of the fraud output system 112, may operate on another machine (e.g., a computer such as a server) within the FI system 110, or may operate on machine separate from the FI system 110 (e.g., in a cloud system, on a user device, etc.)

The fraud output system 112 may determine the fraud output (e.g., category or score) based a variety of data including, for example, a transaction history of the user, user profile data (e.g., user age, credit data, income data), merchant data, and transaction data (e.g., user name or identification, user account number, merchant name, merchant account number, amount of the transaction, location of the transaction, type of transaction, user voice or text data, merchant voice or text data). Fraud scores may be provided on any scoring system and in some examples a fraud score may be output as a score and a confidence level. Fraud categories include any category of fraud including identity theft and financial theft (e.g., recurring transaction).

The FI system 110 may operate in an environment 100 that includes user device(s) 130, delegate device(s) 132,134 and one or more financial entity systems 150. The environment 100 may further include a network 140, for example the internet, to facilitate communications between or among the FI system 110, user device(s) 130, delegate device(s) 132, 134, and financial entity systems 150. In an example, the user device(s) 130, delegate device(s) 132, 134, and/or financial entity systems 150 may communicate with the FI system 110 using the network 140, while in other examples, they may communicate using a direct communication technique (e.g., NFC, Wi-Fi direct, etc.). Each of the user device(s) 130 and delegate device(s) 132, 134 may a mobile device (e.g., a mobile phone or tablet) or a personal computer, for example. The user device(s) 130 and delegate device(s) 132, 134 may each include memory, a processor, a display (e.g., for presenting a user interface, such as a user interface for displaying banking application pages), and optionally a camera.

The example financial entity systems 150 may include one or more of a peer-to-peer (P2P) network 151, a credit card network 152, a banking network 153, a blockchain network 154, merchant banks 155, and merchant systems 156, as examples. The financial entity systems 150 may, for example, send transaction data (e.g., as part of a transaction request) over the network 140 to the FI system 110. The merchant systems 156 may be associated with merchant banks 155 which may maintain bank accounts for receipt of payments (e.g., upon approval by one or more delegates notified of a transaction). The blockchain network 150 may be any type of distributed ledger system.

The FI system 110 may further include a data store 120 that stores user data 121 including notification schemes 122, user account data 126, and user profile data. The data store 120 may further store fraud models 128 which may be used to determine fraud scores or categories based on transaction data. Within a notification scheme 122, the data store 120 may store delegate data 123, alert data 124 and prioritization schemes 125. The data store 120 may include multiple databases on different servers in some examples.

The FI system 110 may include one or more processors and a memory (e.g., a memory system) and may be deployed across one or several different servers of a financial institution (e.g., bank or P2P company). The FT system 110 may further interact with other servers of the financial institution as well as with outside systems. The FI system 110 may also include a banking application (app) 114. The banking app 114 may be a mobile or online (e.g., personal computer) banking application that serves web pages for display on a user device 130. The banking app 114 may also receive inputs from a user device 130 configurating a notification scheme for the user. Configuring may include, e.g., providing delegate data for one or more delegates, providing alert data defining trigger events (e.g., conditions for an alert), associating delegate(s) with trigger event(s), and optionally providing priority data for the trigger event(s) and delegate(s).

The delegate notification system 111 may transmit notification messages to delegates associated with triggered trigger events. Notification messages may be transmitted to delegates over any communication channel. Example channels include text, email, phone, online banking inboxes, notifications on delegate devices such as phones, tablets, computers, and televisions. Optionally, the delegate notification system 111 may transmit a message to the user, such as a notification or alert, in response to determining one or more trigger events have occurred. The message may, for example, inform the user that one or more delegates are being contacted about the transaction (e.g., asked to approve the transaction). Messages to users may be transmitted over any communication channel, such as those described above.

In some examples, notification messages may be transmitted using a prioritization scheme. A prioritization scheme may be created (e.g., based on user input, automatically by the FI system 110) that sets how an individual delegate receives messages and/or how messages are transmitted to multiple delegates. A prioritization scheme may, e.g., include a simultaneous notification setting where notification messages are simultaneously transmitted to multiple delegates. In another example, the prioritization scheme may include a priority notification setting where a notification message is transmitted to a first delegate and then optionally a second delegate. A prioritization scheme may also include a priority setting for an individual delegate and may, for example, specify the communication channels and the priority of each channel (e.g., sequential or simultaneous). A prioritization scheme may also identify one or more authority levels of a delegate. Example authority levels include ability to cancel transaction account (e.g., the credit card used for a transaction), ability to approve or reject transaction, ability to flag transaction (e.g., a delegate may have soft authority to flag a transaction but not hard authority to reject or approve a transaction), and ability to receive notification alerts without further authority.

The delegate notification system 111 may further receive response messages from notified delegates. A response message may include an approval message, a rejection message, or a flag message, as just some examples. Based on the response message, the delegate notification system 111 may send messages to other systems such as the transaction processing system 113 and an enterprise fraud system 129. For example, a transaction rejection message or transaction approved message may be sent to the transaction processing system 113 when a rejection or approval message is received from a delegate. In another example, when a delegate flags a transaction (e.g., as suspicious), data may be sent to the enterprise fraud system 129 for further evaluation of the transaction.

Figure 2:
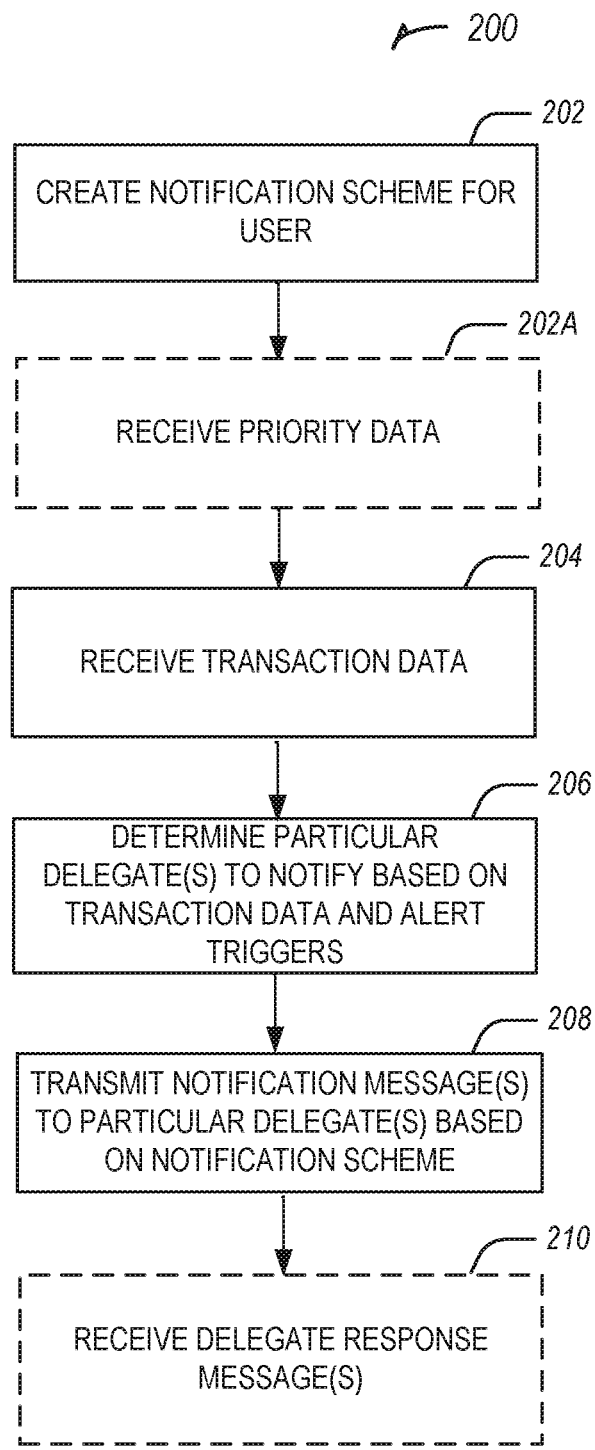
FIG. 2 illustrates a method for providing delegate notifications in accordance with some embodiments.

FIG. 2 illustrates a method 200 for providing delegate notifications in accordance with some embodiments. The method 200 may be used to provide delegate notifications for a user (e.g., an elderly customer) transactions so that trusted advisors are notified of transactions that meet the conditions of one or more trigger events. The method 200 may be carried out by a computing device that includes one or more processors and a memory, such as a FI system 110 described with reference to at least FIG. 1. In some examples, the computing device may implement all of the operations of method 200. In other examples, the computing device may implement some of the operations of method 200 and other operation(s) may be made carried out by another system. The method 200 is described with continuing reference to the one or more components that may carry out the method, such as those illustrated and described with reference to the environment 100 of FIG. 1.

At operation 202, the method 200 includes creating a notification scheme for a user. This may include receiving alert data including parameters for an intervention alert trigger events and delegate data including contact information for one or more delegates. This may further include associating each intervention alert trigger event with one or multiple delegates. Alert data and delegate data and associations therebetween may be received from a user (e.g., input from a user device) and/or may be automatically received from the financial institution (e.g., FI system 110 may require or have default intervention alert trigger event for users over a certain age, for certain accounts and/or for certain transaction amounts). Intervention alert trigger events may be based on a variety of factors, including one or more of a transaction amount, a transaction type (on-line, in-person, credit card, debit card, ACH, wire, etc.), a merchant type (new, merchant category based on product/services provided, etc.), and an account type (e.g., credit card, checking, brokerage, P2P account, etc.).

The method 200 may optionally include receiving priority data at operation 202A. The priority data may establish a prioritization scheme for notifying the delegate(s) of a user. A prioritization scheme may include one or more settings that prioritize the transmission of message(s) to the delegate(s). This may include a setting prioritizing how messages are transmitted to a delegate (e.g., text, phone, and/or email; sequential or simultaneous) and/or one or more settings prioritizing how messages are transmitted when multiple delegates are to be notified (e.g., sequential, or simultaneous). Operation 202A may further include receiving priority data establishing an authority level for a delegate (e.g., approval authority, rejection authority, flagging authority).

At operation 204, the method 200 includes receiving transaction data for a transaction involving the user (e.g., vulnerable customer). This may include receiving transaction data from one or more devices (e.g., a user device 120, a financial system 150 device, a merchant device, or from another device associated with FI system 110 such as a bank teller computer). Transaction data may include any data related to a transaction including, for example, user name or identification, user account number, merchant name, merchant account number, amount of the transaction, location of the transaction, type of transaction (e.g., credit card, ACH, wire, etc.), user voice or text data, merchant voice or text data. In some examples, transaction data may be received from a user device in response to, for example, a user requesting assistance. For example, an extension on a web browser may be provided that allows a user to request delegate assistance with a transaction proposed on the web browser and, upon such a request, transaction data associated with the transaction may be sent to and received by the FI system and used to determine triggered trigger events and associated delegate(s).

At operation 206, the method 200 includes determining one or more particular delegates to notify of the transaction based on the transaction data and alert trigger events. This may include determining triggered events (e.g., trigger events that have occurred) based on the trigger events and transaction data and determining the delegate(s) associated with each triggered alert event. Operation 206 may further include determining the particular delegate(s) based on priority data. For example, the priority data may specific which one or more delegates of multiple delegates are to receive a notification. Operation 206 may further include determining particular delegate(s) based on a fraud output such as a fraud score or fraud category. A fraud output may be determined using the transaction data. An example of determining a fraud output is described with reference to FIG. 3.

At operation 208, the method 200 includes transmitting one or more notification messages to the particular delegate(s) based on the notification scheme. This may include transmitting message(s) to delegate(s) over one or more communication channels, including for example, text, email, phone, online banking inboxes, notifications on delegate devices such as phones, tablets, computers, and televisions. In some examples, operation 208 may include transmitting messages based on priority data. As noted above, priority data may be received (e.g., based on user input, automatically by an FI system) that sets how an individual delegate receives messages and/or how messages are transmitted to multiple delegates. In one example, operation 208 includes simultaneously transmitting notification messages to multiple delegates. In another example, operation 208 includes transmitting notification message in a sequential or cascading manner where a first delegate receives a notification and then optionally a second delegate, and so forth. In another example, operation 208 may include transmitting notification message(s) to a particular delegate over multiple communication channels sequentially or simultaneously. Optionally, a message may be transmitted to the user, such as a notification or alert, in response to determining one or more trigger events have occurred. The message may, for example, inform the user that one or more delegates are being contacted about the transaction (e.g., asked to approve the transaction).

At operation 210, the method optionally includes receiving one or more delegate response messages. In some examples, a delegate response message may include an approval message, a rejection message, or a flag message. Based on the response message, a delegate notification system may, for example, send messages to other systems such as a transaction processing system and/or an enterprise fraud system. For example, a transaction rejection message or transaction approved message may be sent (e.g., automatically) to a transaction processing system when a rejection or approval message is received from a delegate. In another example, when a delegate flags a transaction (e.g., as suspicious), data may be sent to an enterprise fraud system for further evaluation of the transaction. In another example, a response message may include instructions to suspend transactions on an account, stop a specific transaction, stop or cancel a check, unwind or halt a pending cryptocurrency transaction, or to cancel a credit card and obtain a new one. In some examples, a transaction will not proceed until an approval message is received and a signal is sent to a transaction processing system.

A delegate notification message and delegate response message may be transmitted to and received from the same delegate device over the same communication channel or transmitted to and received from different delegate devices over the same or different communication channels. For example, a notification message may be sent as a text message and a delegate device may respond with a text message. In another example, a notification message may be sent by email or text, and a delegate may provide a response message by phone. The content of a notification message to a delegate may vary. In one example, the notification message includes transaction data (e.g., transaction amount, merchant name, fraud score, and/or fraud category) and information on how to respond (e.g., hyperlinks to approve, reject, or flag the transaction, instruction to text a 1, 2, or 3 to approve, reject or flag a transaction). A notification message may also include information (e.g., a phone number, email, hyperlink) for contacting the user.

Intervention alert trigger events may be set by the user or the financial institution, as discussed above. Any number of trigger events may be established for a user. These include by way of example and not limitation, trigger events based on transaction amounts, recurring transactions (e.g., with same entity and/or within a defined period of time), merchant type (e.g., known fraudulent entities), fraud or stress analysis of user or merchant voice or text data, etc. In some examples, alert data may be updated automatically by an FI system based on delegate response messages. For example, an intervention alert trigger event triggered by recurring transactions that is approved by a delegate may be removed or modified (e.g., amount threshold increased, number of recurring transactions in a defined time period increased). In another example, an intervention alert trigger event triggered by a transaction with a new merchant that is approved by a delegate may be removed or modified. For example, a delegate notification system may automatically delete a trigger event if one or more transaction triggering the trigger event have been approved. In another example, the delegate notification system may automatically adjust a condition of a triggered event (e.g., increase an amount threshold) if one or more transactions triggering the condition (e.g., a lower threshold) have been approved.

Figure 3:
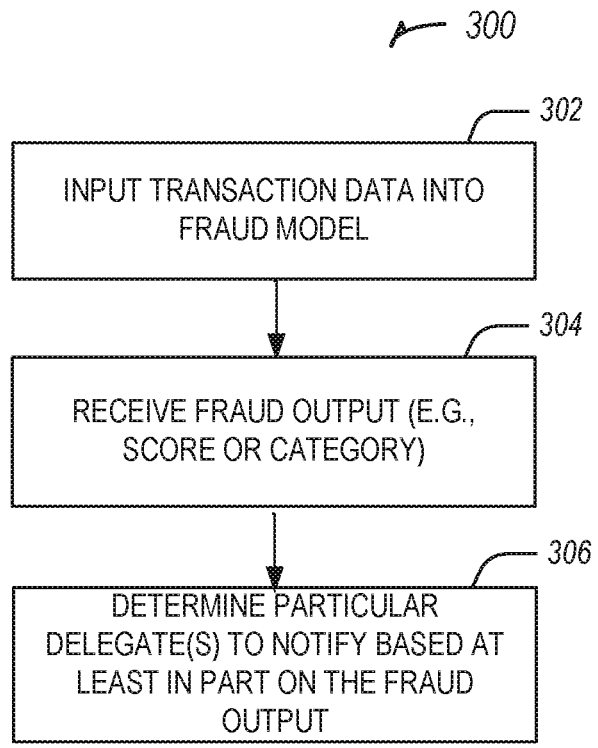
FIG. 3 illustrates a method for providing delegate notifications based on a fraud output in accordance with some embodiments.

FIG. 3 illustrates a method 300 for determining delegate notifications based on a fraud output in accordance with some embodiments. The method 300 may be used to provide delegate notifications for a user (e.g., an elderly customer) transactions based on a fraud output such as a fraud score and/or fraud category for the transaction. The method 300 may be carried out by a computing device that includes one or more processors and a memory, such as a FI system 110 described with reference to at least FIG. 1. In some examples, the computing device may implement all of the operations of method 200. In other examples, the computing device may implement some of the operations of method 200 and other operation(s) may be made carried out by another system. The method 300 is described with continuing reference to the one or more components that may carry out the method, such as those illustrated and described with reference to the environment 100 of FIG. 1.

At operation 302, the method 300 may include inputting transaction data into a fraud model. The transaction data may be received as discussed above with respect to FIG. 1 and/or FIG. 2. In some examples, operation 302 includes retrieving a fraud model from a data store and inputting transaction data into the fraud model. Retrieving a fraud model may include querying the fraud model data store with user profile data or transaction data to retrieve an appropriate fraud model for evaluating a transaction. At operation 304, the method may include receiving a fraud output from the fraud model. The fraud output may, for example, be a fraud score and/or a fraud category. The fraud score may for example indicate a likelihood of the transaction being fraudulent. A fraud category may for example indicate that the transaction is at risk of identity theft or financial theft. At operation 306, the method 300 includes determining particular delegate(s) to notify based at least on the fraud output. Notifications may be transmitted to the particular delegate(s) as discussed above with regard to FIG. 1 and/or FIG. 2 (e.g., operation 202). In some examples, determining particular delegate(s) to notify based on the fraud output includes determining the delegate(s) based on a notification a scheme and/or priority data in addition to the fraud output, as discussed herein.

Any number of fraud models may be associated with a user and/or particular types of transactions. For example, a fraud model may be provided that generates a fraud likelihood score for a transaction based on historical fraud pattern data. Historical fraud pattern data may include data from a general user population and/or data from the user involved in the transaction. In one example, a fraud model may detect user behavior deviation and output fraud likelihood score based on the deviation. User behavior deviation may, for example, include a higher than usual transaction amount, a transaction with a new merchant, a transaction at a new merchant location, etc.

In another example, a fraud model may also be provided that that determine a fraud output based on transaction data that includes interactions between a user and a merchant (e.g., a potential fraudster) such as voice data or text data. In some examples, voice data may be converted to text data using speech-to-text conversion techniques. The fraud model may include fraud indication keywords and base a fraud output on identification of these keywords in the transaction data. In another example, a fraud model may be provided that analyzes transaction data such as a user's voiceprint and/or a merchant's voiceprint to detect signs of stress, which may indicate a potential fraudulent offer, and output a fraud output based on the voiceprint.

Figure 4:
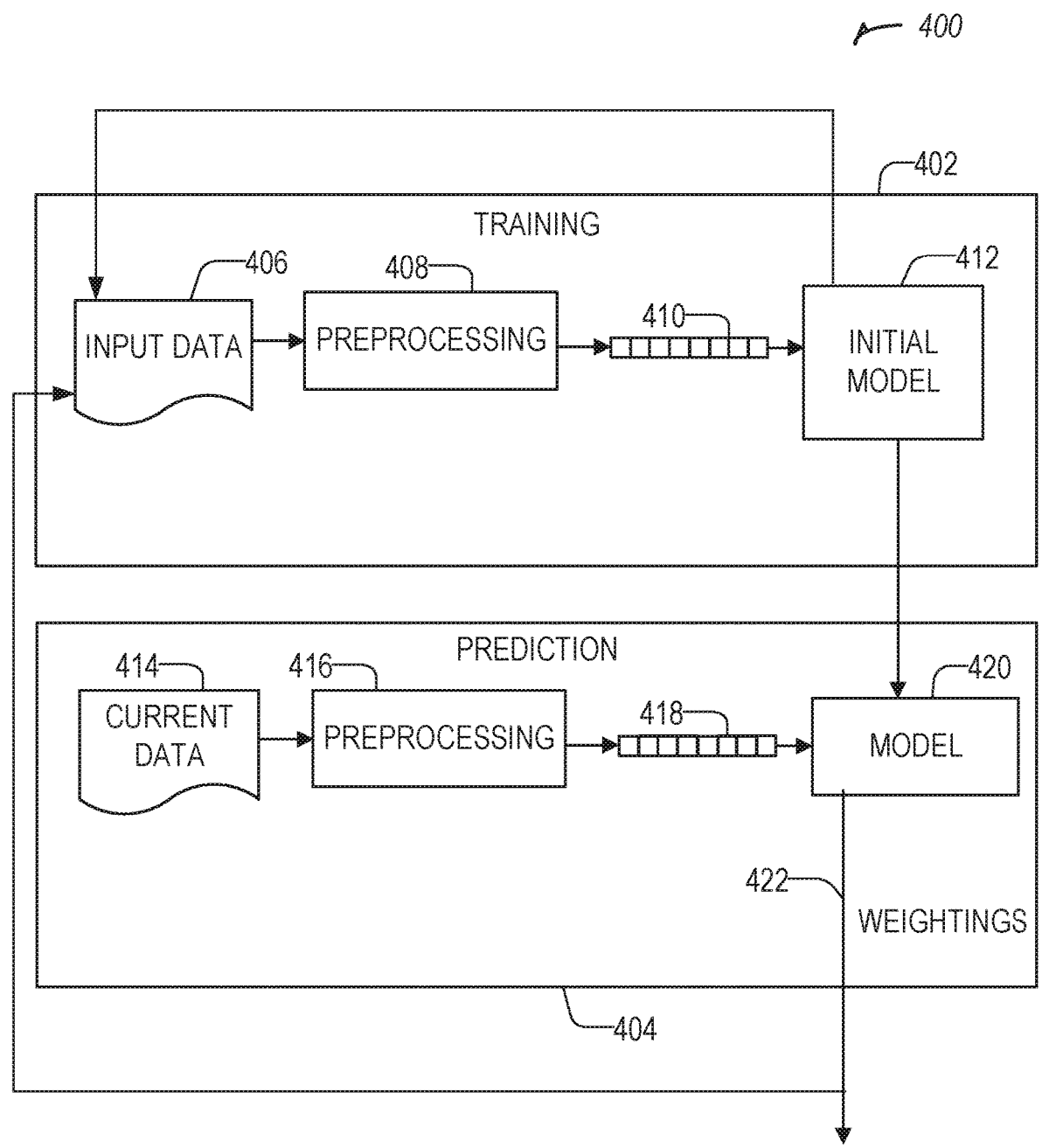
FIG. 4 illustrates a machine learning engine for training and execution related to providing a fraud output in accordance with some embodiments.

FIG. 4 illustrates a machine learning engine for training and execution related to providing a fraud output in accordance with some embodiments. The machine learning (ML) engine can be deployed to execute at a mobile device (e.g., a cell phone) or a computer. For example, with reference to FIG. 1, an ML engine may be part of the fraud output system 112, may operate on another machine (e.g., a computer such as a server) within the FI system 110, or may operate on machine separate from the FI system 110 (e.g., in a cloud system, on a user device, etc.). A system may calculate one or more weightings for criteria based upon one or more machine learning algorithms. FIG. 4 shows an example machine learning engine 400 according to some examples of the present disclosure.

Machine learning engine 400 utilizes a training engine 402 and a prediction engine 404. Training engine 402 uses input data 406, after undergoing preprocessing component 408, to determine one or more features 410. The one or more features 410 may be used to generate an initial model 412, which may be updated iteratively or with future unlabeled data.

The input data 406 may include transaction data for transactions (e.g., historical transaction data). The input data 406 may include transaction data specific to the user, transaction data from a general population, and/or transaction data from a demographic associated with the user. The transaction data may include historical fraud pattern data, transactions identified as fraudulent, and transactions identified as not fraudulent.

In the prediction engine 404, current data 414 may be input to preprocessing component 416. In some examples, preprocessing component 416 and preprocessing component 408 are the same. The prediction engine 404 produces feature vector 418 from the preprocessed current data, which is input into the model 420 to generate one or more criteria weightings 422. The criteria weightings 422 may be used to output a prediction, as discussed further below. The current data 414 may include transaction data (including, for example, user name or identification, user account number, merchant name, merchant account number, amount of the transaction, location of the transaction, type of transaction, user voice or text data, and merchant voice or text data etc.) and/or user profile data (including, for example, name, age, income data, credit data, voice data, behavior history, etc.).

The training engine 402 may operate in an offline manner to train the model 420 (e.g., on a server). The prediction engine 404 may be designed to operate in an online manner (e.g., in real-time, at a mobile device, on a cloud system, etc.). In other examples, the training engine 402 may operate in an online manner (e.g., in real-time, at a mobile device, on a cloud system, etc.). In some examples, the model 420 may be periodically updated via additional training (e.g., via updated input data 406 or based on labeled or unlabeled data output in the weightings 422) or feedback (e.g., feedback from users, delegates, bank personnel, etc.). The initial model 412 may be updated using further input data 406 until a satisfactory model 420 is generated. The model 420 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 402 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 402. In an example embodiment, a regression model is used and the model 420 is a vector of coefficients corresponding to a learned importance for each of the features in the vector of features 410, 418. Once trained, the model 420 may output a fraud output such as a fraud score or category, as discussed above.

FIG. 5 illustrates user interfaces 510 and 520 generating and viewing notification alerts in accordance with some embodiments. The user interfaces 510 and 520 may be provided on a user device such as mobile device or a personal computer or may be provided on a financial institution (FI) device, such as a personal computer at an FI branch. The user interface 510 may be used to generate one or more notification to delegates of a user. The user interface 510 includes various user interface components for providing information corresponding to a notification alert, such as selectable options for one or more user accounts, trigger events, delegates, and priority settings. The information entered in the user interface 510 may be captured and used to generate a notification scheme for the user. For example, the information may be transmitted to an FI device such as FI device 110 of FIG. 1 and the FI device may create and store notification schemes (e.g., schemes 122) for the user. The selectable options may be limited, for example based on a user profile or account type (e.g., a trigger event for a credit card account may not include a trigger event for an ACH or wire transaction), a previously or concurrently selected option (e.g., if only one delegate is selected for a trigger event, only a notification priority setting may be entered and not a notify priority setting since there are not multiple delegates to notify), or the like. The user interface 520 may be used to view a notification alert for a user, such as with previously entered details. The user interface 520 includes an example of a checking account with a trigger event being an ACH transaction greater than $1,000. Upon triggering, delegates A and B are to be notified with a notification priority setting of simultaneously. A communication channel priority setting may also be provided, setting the priority for each delegate's communication channels.

FIG. 6 illustrates an example notification scheme 610 in accordance with some embodiments. Any number of notification schemes may be provided for a user. The example notification scheme 610 includes trigger events 612 based on transaction amount thresholds for credit card (CC) transaction, by way of example and not limitation. The notification scheme 610 includes multiple trigger events 612 based on transaction amounts with certain ranges. The notification scheme 610 further includes one or more delegates 614 associated with each trigger event 612. The notification scheme 610 further includes priority data such as notification priority settings 616 and communication channel priority settings 618 associated with each trigger alert 612 and corresponding delegate(s). Where the trigger event is associate with multiple delegates, the notification priority settings 616 may specify whether the delegates are to be notified sequentially or simultaneously. For each delegate, the communication channel setting 618 may specify what channels notifications are used for communication and in what priority.

The notification scheme 610 generally provides for delegate A to be notified on lowest risk transactions and delegates A or B, A and B, or B and C to be notified on higher risk transactions. For example, for a credit card transaction between $100 and $500, delegate A is notified by email and text sequentially. For a credit card transaction between $500 and $1,000, delegates A or B are notified in a sequential manner. In this case, A notification priority setting may specify delegate A to be notified first and then delegate B notified afterwards. In some examples, the notification priority setting may include that a response from delegate A is sufficient, and that delegate B need not be notified after receiving a response from delegate A. For a credit card transaction between $1,000 and $5,000, delegates A and B are notified in a sequential manner. The notification priority setting may specify that a notification be sent first to delegate A, a response from delegate A received, and then a notification sent to delegate B (which may include delegate A's response). For a credit card transaction over $5,000 delegates B and C are notified in a simultaneously (e.g., at the same time, near the same time, or independently). In one example, a response from delegate B or C may be sufficient (e.g., either A or B may approve or reject or flag the transaction and the transaction may proceed without the other delegate's response). In another example, a response from both delegates B and C may be required to take further action (e.g., both B and C must approve or reject or flag the transaction and the transaction may not proceed without both delegate responses).

The communication channel priority settings 618 may include a setting for which communication channels to use (e.g., text, phone, email, etc.) and in what order (e.g., simultaneously, cascading, etc.) In some examples, a channel priority setting for a particular delegate can vary depending on the transaction. For example, a transaction for a low dollar amount or a low fraud score may trigger an alert sent over one channel (e.g., text), whereas a higher transaction amount or higher fraud score may trigger an alert that is simultaneous sent over multiple channels (text, phone, email).

The above techniques provide delegate notification techniques for users (e.g., vulnerable consumers) that engage delegates in the event an intervention alert for a transaction is triggered. The present subject matter may, for example, create a delegate notification scheme for a user, where the delegate notification scheme includes one or more delegates for a user and one or more intervention alert triggers associated with each of the delegates. The present subject matter may further include creating a prioritization scheme for one or more delegates associated with a triggered alert and transmitting notification message(s) based on the prioritization scheme. Notified delegates may take a number of actions including, for example, approving or rejecting the transaction, flagging the transaction (e.g., for fraud review), and/or contacting the user. Further, the present subject matter may also use fraud models to determine a fraud output (e.g., a fraud score or category) and, based on the fraud output, determine whether alerts are triggered, notify delegate(s) of the user accordingly. Using any of the above techniques, the present subject provides ways to provide delegate notifications for users (e.g., a vulnerable consumer) to avoid fraudulent transactions.

Figure 7:
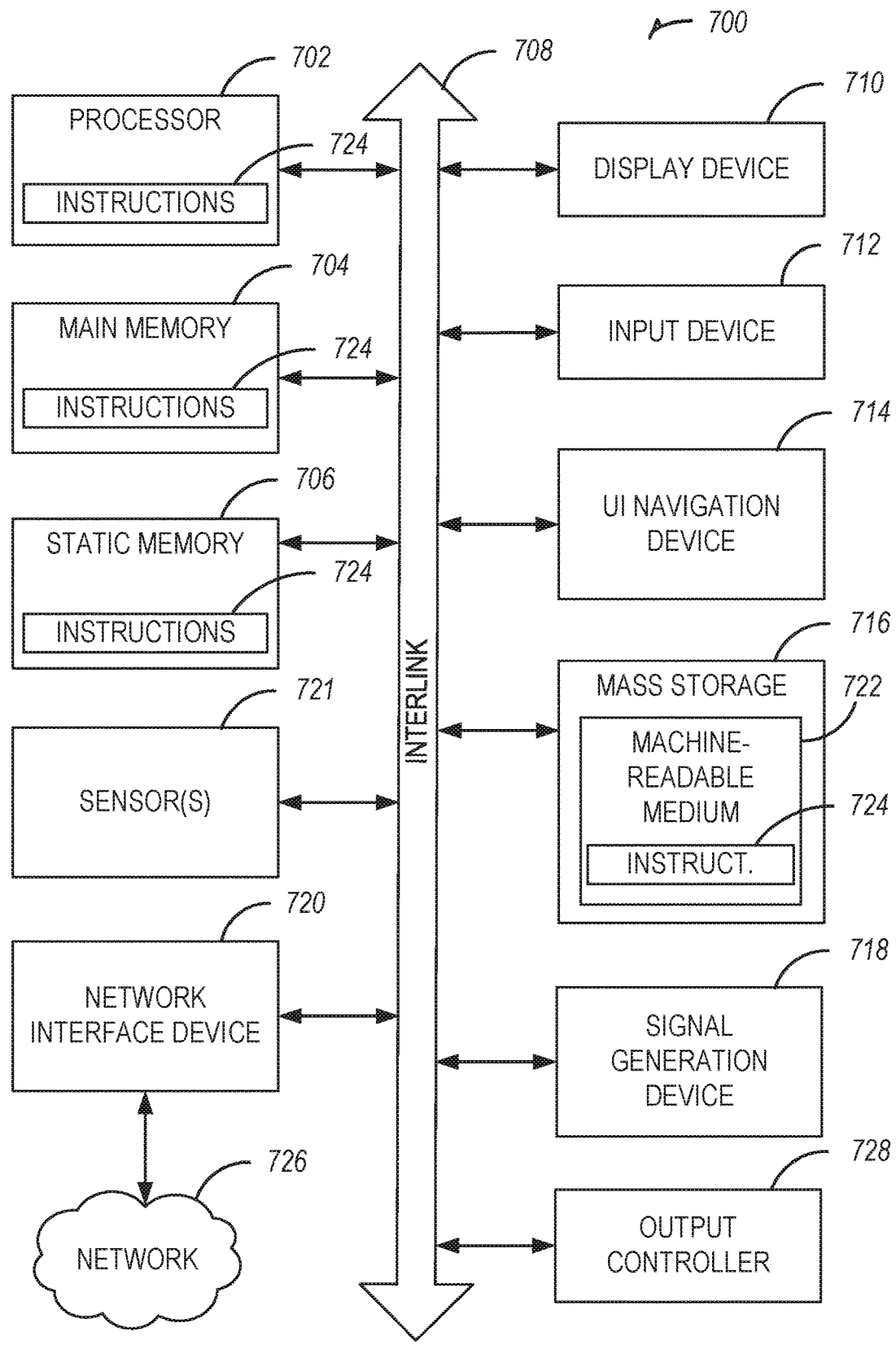
FIG. 7 illustrates generally an example of a block diagram of a machine upon which any one or more of the techniques discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. As an example, the methods described above (e.g., methods 200 and 300) may be implemented by a machine 700 (a single machine or collection of machines). As another example, in FIG. 1, each of the illustrated components may be implemented on a machine 700 (a single machine or collection of machines).

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 730, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 730 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 730 may include one or more physical jacks (e.g., Ethernet, coaxial, or phone jacks) or one or more antennas to connect to the communications network 726. In an example, the network interface device 730 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

The following, non-limiting examples, detail certain aspects of the present subject matter to solve the challenges and provide the benefits discussed herein, among others.

Example 1 is a computing device, comprising: one or more processors; a memory, the memory storing instructions, which when executed by the one or more processors, cause the computing device to perform operations comprising: creating a delegate notification scheme for a vulnerable user, the delegate notification scheme including one or more delegates associated with one or more intervention alert trigger events; receiving transaction data for transaction associated with the user from at least one second computing device; in response to determining one or more trigger events have occurred based on the transaction data, determining one or more particular delegates of the one or more delegates; transmitting one or more notification messages to the one or more particular delegates based on the delegate notification scheme; and receiving one or more delegate response messages from the one or more particular delegates.

In Example 2, the subject matter of Example 1 includes, wherein the one or more intervention alert trigger events are based on one or more of a transaction amount, a transaction type, a merchant type, and an account type.

In Example 3, the subject matter of Examples 1-2 includes, wherein creating the delegate notification scheme further includes creating a prioritization scheme for the one or more delegates.

In Example 4, the subject matter of Example 3 includes, wherein transmitting the one or more messages includes transmitting the one or more messages based on the prioritization scheme.

In Example 5, the subject matter of Example 4 includes, wherein the one or more particular delegates includes a first delegate and a second delegate, wherein the first delegate and second delegate are associated with a common intervention alert trigger event or are associated with different intervention alert trigger events.

In Example 6, the subject matter of Example 5 includes, wherein the prioritization scheme includes a simultaneous setting, and wherein transmitting the one or more messages to the one or more particular delegates includes simultaneously transmitting a message to the first delegate and a message to the second delegate based on the simultaneous setting.

In Example 7, the subject matter of Examples 5-6 includes, wherein the prioritization scheme includes a priority setting, and wherein transmitting the one or more messages to the one or more particular delegates includes transmitting a message to the first delegate with priority over the second delegate, based on the priority setting.

In Example 8, the subject matter of Examples 1-7 includes, wherein the operations further include determining a fraud output based on the transaction data; wherein determining the one or more particular delegates includes determining the one or more particular delegates based on the fraud output.

In Example 9, the subject matter of Examples 1-8 includes, wherein the one or more delegate response messages indicates an approval or rejection of the transaction; wherein the operations further include: transmitting an approval signal for a rejection signal, based on the approval or the rejection, to a transaction processing system; and using the transaction processing system, automatically denying the transaction in response to the rejection signal or automatically approving the transaction in response to the approval signal.

In Example 10, the subject matter of Examples 1-9 includes, wherein the one or more delegate response messages indicates a flag message for the transaction; wherein a signal based on the flag message is provided to an enterprise fraud system.

In Example 11, the subject matter of Examples 1-10 includes, wherein transmitting the one or more notification messages includes transmitting to one or more delegate devices associated with the one or more notified delegates; receiving includes receiving the one or more delegate response messages from the one or more delegate devices.

Example 12 is a method, using one or more processors and a memory, comprising: creating a data store including one or more delegates associated with one or more intervention alert trigger events; receiving transaction data associated with a transaction; determining one or more triggered events based on the one or more intervention alert trigger events and the transaction data; in response to determining one or more triggered events, determining one or more particular delegates of the one or more delegates based on the one or more triggered events; transmitting one or more notification messages to the one or more particular delegates; and receiving one or more delegate response messages from the one or more particular delegates.

In Example 13, the subject matter of Example 12 includes, wherein creating the delegate notification scheme further includes receiving priority data for the one or more delegates; and wherein transmitting the one or more messages includes transmitting the one or more messages based on the priority data.

In Example 14, the subject matter of Example 13 includes, wherein the priority data includes a simultaneous setting, and wherein transmitting the one or more messages to the one or more particular delegates includes simultaneously transmitting a message to a first delegate and a message to a second delegate based on the simultaneous setting.

In Example 15, the subject matter of Examples 13-14 includes, wherein the priority data includes a priority setting, and wherein transmitting the one or more messages to the one or more particular delegates includes transmitting a message to a first delegate with priority over a second delegate, based on the priority setting.

Example 16 is at least one non-transitory machine-readable medium including instructions that, when executed by processing circuitry, cause the processing circuitry to perform operations comprising: creating a delegate notification scheme for a user, the delegate notification scheme including one or more delegates associated with one or more intervention alert trigger events; receiving transaction data associated with a transaction from a computing device; determining one or more particular delegates of the one or more delegates based on the transaction data and the one or more interventions alert trigger events; transmitting one or more notification messages to the one or more particular delegates based on the one or more triggered alert events; and receiving one or more delegate response messages from the one or more particular delegates.

In Example 17, the subject matter of Example 16 includes, wherein the operations further include determining a fraud output based on the transaction data; wherein determining the one or more particular delegates includes determining the one or more particular delegates based on the fraud output.

In Example 18, the subject matter of Examples 16-17 includes, wherein the one or more delegate response messages indicates an approval or rejection of the transaction; wherein a signal based on the approval, or the rejection is provided to a transaction processing system.

In Example 19, the subject matter of Examples 16-18 includes, wherein the one or more delegate response messages indicates a flag message for the transaction; wherein a signal based on the flag message is provided to an enterprise fraud system.

In Example 20, the subject matter of Examples 16-19 includes, wherein transmitting the one or more notification messages includes transmitting to one or more delegate devices associated with the one or more notified delegates; receiving includes receiving the one or more delegate response messages from the one or more delegate devices.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A computing device, comprising:
   one or more processors;
   a memory, the memory storing instructions, which when executed by the one or more processors, cause the computing device to perform operations comprising:
   creating a delegate notification scheme for a vulnerable user, the delegate notification scheme including one or more delegates associated with one or more intervention alert trigger events;
   creating a prioritization scheme to transmit one or more notification messages to the one or more delegates by:
      selecting, for each of the one or more delegates, a communications channel used to transmit the one or more notification messages, and
      assigning, to the communications channel, a channel priority used to transmit the one or more notification messages based on an input of the vulnerable user, wherein the channel priority comprises a sequential transmission, a simultaneous transmission, or a combination thereof, of the one or more notification messages to one or more user devices;
   receiving, via banking network, transaction data for a transaction associated with the vulnerable user from at least one second computing device;
   automatically determining that one or more trigger events have occurred based on the one or more intervention alert trigger events and the transaction data;
   in response to automatically determining that the one or more trigger events have occurred, determining one or more particular delegates of the one or more delegates;
   automatically transmitting, to the one or more user devices via the banking network using the sequential transmission, the simultaneous transmission, or the combination thereof, the one or more notification messages to the one or more particular delegates based on the delegate notification scheme and on the prioritization scheme when the one or more trigger events have occurred, wherein a first message of the one or more notification messages is selected for transmission to a first delegate of the one or more particular delegates based on the channel priority;

preventing transmission of a second message for a predetermined amount of time;

automatically transmitting, to the one or more user devices via the banking network using the sequential transmission, the simultaneous transmission, or the combination thereof, the second message of the one or more notification messages to a second delegate of the one or more particular delegates when the predetermined amount of time has expired; and receiving, via the banking network, one or more delegate response messages from the one or more particular delegates, wherein the one or more delegate response messages indicates an approval or a rejection of the transaction and wherein the banking network automatically processes the transaction to debit or to credit an account identified via the transaction data based on the approval of the transaction and not on the rejection.

2. The computing device of claim 1, wherein the one or more intervention alert trigger events are based on one or more of a transaction amount, a transaction type, a merchant type, and an account type.

3. The computing device of claim 1, wherein the one or more particular delegates includes the first delegate and the second delegate, wherein the first delegate and second delegate are associated with a common intervention alert trigger event or are associated with different intervention alert trigger events.

4. The computing device of claim 3, wherein the prioritization scheme includes a simultaneous setting, and wherein transmitting the one or more messages to the one or more particular delegates includes simultaneously transmitting a message to the first delegate and a message to the second delegate based on the simultaneous setting.

5. The computing device of claim 3, wherein the prioritization scheme includes the channel priority, and wherein transmitting the one or more messages to the one or more particular delegates includes transmitting the first message to the first delegate with priority over the second delegate, based on the input of the vulnerable user.

6. The computing device of claim 1, wherein the operations further include determining a fraud output based on the transaction data; wherein determining the one or more particular delegates includes determining the one or more particular delegates based on the fraud output.

7. The computing device of claim 1, wherein the one or more delegate response messages indicates a flag message for the transaction; wherein a signal based on the flag message is provided to an enterprise fraud system.

8. The computing device of claim 1, wherein transmitting the one or more notification messages includes transmitting to one or more delegate devices associated with the one or more notified delegates; receiving includes receiving the one or more delegate response messages from the one or more delegate devices.

9. The computing device of claim 1, wherein determining that the one or more trigger events have occurred further comprises:

analyzing voice data from the transaction data using a voiceprint analysis model to detect stress indicators in the vulnerable user or a merchant voice data;

determining a fraud output based on the detected stress indicators; and triggering the occurrence of the one or more trigger events when the stress indicators exceed a predefined threshold.

10. A method, using one or more processors and a memory, comprising:

creating a data store including one or more delegates associated with one or more intervention alert trigger events;

creating a prioritization scheme to transmit one or more notification messages to the one or more delegates by:

selecting, for each of the one or more delegates, a communications channel used to transmit the one or more notification messages, and assigning, to the communications channel, a channel priority used to transmit the one or more notification messages based on an input of a vulnerable user, wherein the channel priority comprises a sequential transmission, a simultaneous transmission, or a combination thereof, of the one or more notification messages to one or more user devices;

receiving, via banking network, transaction data associated with a transaction;

automatically determining that one or more triggered events have occurred based on the one or more intervention alert trigger events and the transaction data;

in response to automatically determining that the one or more triggered events have occurred, determining one or more particular delegates of the one or more delegates;

automatically transmitting, to the one or more user devices via the banking network using the sequential transmission, the simultaneous transmission, or the combination thereof, the one or more notification messages to the one or more particular delegates based on the one or more triggered alert events and on the prioritization scheme when the one or more trigger events have occurred, wherein a first message of the one or more notification messages is selected for transmission to a first delegate of the one or more particular delegates based on the channel priority;

preventing transmission of a second message for a predetermined amount of time;

automatically transmitting, to the one or more user devices via the banking network using the sequential transmission, the simultaneous transmission, or the combination thereof, the second message of the one or more notification messages to a second delegate of the one or more particular delegates when the predetermined amount of time has expired; and receiving, via the banking network, one or more delegate response messages from the one or more particular delegates, wherein the one or more delegate response messages indicates an approval or a rejection of the transaction and wherein the banking network automatically processes the transaction to debit or to credit an account identified via the transaction data based on the approval of the transaction and not on the rejection.

11. The method of claim 10, wherein the channel priority includes a simultaneous setting, and wherein transmitting the one or more messages to the one or more particular delegates includes simultaneously transmitting a message to a first delegate and a message to a second delegate based on the simultaneous setting.

12. The method of claim 10, wherein the prioritization scheme includes the channel priority, and wherein transmitting the one or more messages to the one or more particular delegates includes transmitting the first message to the first delegate with priority over the second delegate, based on the input of the vulnerable user.

13. At least one non-transitory machine-readable medium including instructions that, when executed by processing circuitry, cause the processing circuitry to perform operations comprising:
creating a delegate notification scheme for a user, the delegate notification scheme including one or more delegates associated with one or more intervention alert trigger events;
creating a prioritization scheme to transmit one or more notification messages to the one or more delegates by:
selecting, for each of the one or more delegates, a communications channel used to transmit the one or more notification messages, and
assigning, to the communications channel, a channel priority used to transmit the one or more notification messages based on an input of a vulnerable user, wherein the channel priority comprises a sequential transmission, a simultaneous transmission, or a combination thereof, of the one or more notification messages to one or more user devices;
receiving, via banking network, transaction data associated with a transaction from a computing device;
automatically determining that one or more trigger events have occurred based on the one or more intervention alert trigger events and the transaction data;
in response to automatically determining that the one or more trigger events have occurred, determining one or more particular delegates of the one or more delegates;
automatically transmitting, to the one or more user devices via the banking network using the sequential transmission, the simultaneous transmission, or the combination thereof, the one or more notification messages to the one or more particular delegates based on the one or more triggered alert events and on the prioritization scheme when the one or more trigger events have occurred, wherein a first message of the one or more notification messages is selected for transmission to a first delegate of the one or more particular delegates based on the channel priority;
preventing transmission of a second message for a predetermined amount of time;
automatically transmitting, to the one or more user devices via the banking network using the sequential transmission, the simultaneous transmission, or the combination thereof, the second message of the one or more notification messages to a second delegate of the one or more particular delegates when the predetermined amount of time has expired; and
receiving, via the banking network, one or more delegate response messages from the one or more particular delegates, wherein the one or more delegate response messages indicates an approval or a rejection of the transaction and wherein the banking network automatically processes the transaction to debit or to credit an account identified via the transaction data based on the approval of the transaction and not on the rejection.

14. The at least one non-transitory machine-readable medium of claim 13, wherein the operations further include determining a fraud output based on the transaction data; wherein determining the one or more particular delegates includes determining the one or more particular delegates based on the fraud output.

15. The at least one non-transitory machine-readable medium of claim 13, wherein the one or more delegate response messages indicates a flag message for the transaction; wherein a signal based on the flag message is provided to an enterprise fraud system.

16. The at least one non-transitory machine-readable medium of claim 13, wherein transmitting the one or more notification messages includes transmitting to one or more delegate devices associated with the one or more notified delegates; receiving includes receiving the one or more delegate response messages from the one or more delegate devices.

* * * * *